United States Patent [19]

Tlaker

[11] Patent Number: 4,533,858
[45] Date of Patent: Aug. 6, 1985

[54] TEMPERATURE COMPENSATION APPARATUS FOR GEAR SHAPERS

[75] Inventor: Erich Tlaker, Springfield, Vt.

[73] Assignee: Fellows Corporation, N. Springfield, Vt.

[21] Appl. No.: 533,846

[22] Filed: Sep. 16, 1983

[51] Int. Cl.³ ............................................. G05D 23/275
[52] U.S. Cl. ...................................... 318/634; 318/471; 82/DIG. 1
[58] Field of Search ................ 318/634, 471, 472, 473; 82/DIG. 1

[56] References Cited

U.S. PATENT DOCUMENTS

| | | | |
|---|---|---|---|
| 3,136,218 | 6/1964 | Tripp | 82/DIG. 1 |
| 3,579,073 | 5/1971 | Johnstone | 318/634 |
| 4,195,250 | 3/1980 | Yamamoto | 318/634 X |

FOREIGN PATENT DOCUMENTS

| | | | |
|---|---|---|---|
| 0146410 | 2/1981 | German Democratic Rep. | 82/DIG. 1 |
| 4626029 | 10/1967 | Japan | 318/634 |

Primary Examiner—B. Dobeck
Attorney, Agent, or Firm—Arthur B. Moore

[57] ABSTRACT

An apparatus for compensating for thermal expansion and contraction causing structural part size variations of machine components. The apparatus senses the displacement and temperature of various components of a machine which are designed to move relative to each other along one axis and adjusts this motion in predetermined manner depending upon the sensed displacement and temperature. A programmed control system is responsive to the sensed temperature and converts various sensor outputs to the necessary correction signals for application to the motor causing the relative motion.

5 Claims, 9 Drawing Figures

TEMPERATURE COMPENSATION APPARATUS FOR GEAR SHAPERS

BACKGROUND OF THE INVENTION

1. Field of the Invention

The invention is related generally to apparatus for compensating for temperature-induced structural size variations occurring in machine components during a manufacturing process. More particularly, the invention relates to a temperature compensation apparatus utilized in gear production equipment.

2. Description of the Prior Art

Many manufacturing processes are affected by ambient or operational temperature changes occurring during manufacture. Gear production processes utilizing machinery for producing gears by any one of several methods are particularly sensitive to temperature variations occurring during the manufacturing process. Gear production equipment is generally sensitive to center distance, i.e. the distance between the center of the gear being produced and the center of the tool cutting the gear. Thermal expansion and contraction of various components of gear production equipment causes varying center distance and consequent variations in the gear being produced.

One type of gear production machinery susceptible to such temperature variations is the hydromechanical gear shaping machine as shown in U.S. Pat. Nos. 4,125,056, 4,136,302 and 4,254,690 each of which has been assigned to the assignee of the present invention and is incorporated by reference herein. Such gear shapers are referred to herein as a means of describing the invention although it will be understood that the invention is suitable for other gear production equipment.

A gear shaper such as shown in the aforementioned patents produces gears from a workpiece mounted on a rotating worktable. A cutter is mounted on a spindle whose axis is substantially parallel to the worktable axis. Moving or feeding the cutter spindle relative to the workpiece in a predetermined manner while reciprocating the spindle and rotating the worktable causes the cutter to shape a gear. It is apparent that the center distance between the workpiece and the cutter must be accurately controlled in order to produce the desired shape.

Hydromechanical gear shapers use closed loop servo systems to provide for extremely accurate positioning of the center distance between the centerline of a gear shaper cutter spindle and the centerline of the workpiece through the use of digital or analog feedback devices sensing various parameters of the machine structure. However, such feedback devices are insensitive to temperature dependent expansion and contraction of components of the machine. This creates size changes in the gears being produced, which changes are a function of the operating temperature of the machine components. It has been found that temperature variations during the production of any particular gear, may result in size variations of finished gears of as much as 0.003 inches. This part-size variation is most noticeable in large gears requiring several hours to produce. In extreme circumstances a spiral cut is caused and a step occurs in the gear's circumference. The defective gears so produced must either be re-cut to different specifications or discarded.

Temperature changes may be induced by any number of things. Obviously, ambient temperature changes occurring between the beginning and end of a particular work shift or cycle are significant. Additionally, the mere operation of the gear shaper causes its various components to heat up during the operational cycle. Furthermore, various operating conditions, such as the amount and type of coolant, whether or not the operation is continuous over a work day, types of materials being cut, size of the workpiece, etc., all contribute to operational temperature variations.

Production accuracy of prior art machines is enhanced with limited success by controlling these various temperature inducing parameters to maintain temperature stability. For example, these machines could be operated in temperature controlled, air conditioned environments under constant operating conditions or could be continuously operated 24 hours a day. These various methods used to ensure accurate production are quite costly and, as a practical matter, prior art gear shapers are usually run through a "warm up" period which generally requires considerable time to enable the machine to reach temperature equilibrium. This equilibrium must then be maintained by attempting to operate the machine at a constant cutting rate. Usually, if operating parameters of feed and speed are changed, the heat generated by rotating or reciprocating machine members increases or decreases establishing, after a period of time, a new equilibrium at a different structural temperature which results in an associated size change of the workpiece. Prior art machines are also affected by the fact that various critical machine components, due to their masses and heat dissipation properties, not only reach equilibrium at different temperatures but also over different time spans so that their combined effect on gear size could cause an initial center distance reduction and a subsequent increase as different components of the machine structure change their temperature.

Even if the aforementioned parameters may be controlled, changes in ambient air temperature over a full day of operation, or the temperature of the cutting fluids used will cause additional size changes even at contant cutting speeds and feeds.

It is accordingly an object of this invention to produce an apparatus to compensate for temperature induced structural variations occurring during a manufacturing process. It is a further object of this invention to produce an apparatus for automatically compensating for temperature induced structural variations of gear production equipment.

SUMMARY OF THE INVENTION

These and other objects are achieved by the present invention, the preferred embodiment of which constitutes an apparatus for compensating for thermal expansion or contraction of a machine component along an axis, said component movable along said axis relative to another component by a motor, comprising:

means for establishing a reference temperature;
means for determining an average temperature of said machine component;
comparator means for determining if said average temperature is within predetermined limits;
means responsive to said comparator means for stopping the operation of said machine if said average temperature is not within said limits;

means responsive to said comparator means if said average temperature is within said limits for comparing said average temperature to said reference temperature and for producing a correction signal corresponding to the difference between said average temperature and said reference temperature; and means for applying said correction signal to said motor.

The invention comprises a plurality of sensors placed at predetermined locations on a machine for sensing temperature and displacement and a control system responsive to these sensors for producing a compensating offset signal essentially equal in magnitude to the sum of all detected temperature induced size variations. Thus, a secondary adaptive control loop is superimposed upon the primary closedloop position system in order to maintain accurate part size in spite of temperature induced structural variations of the machine components.

DESCRIPTION OF THE PREFERRED EMBODIMENT

Figure 1:
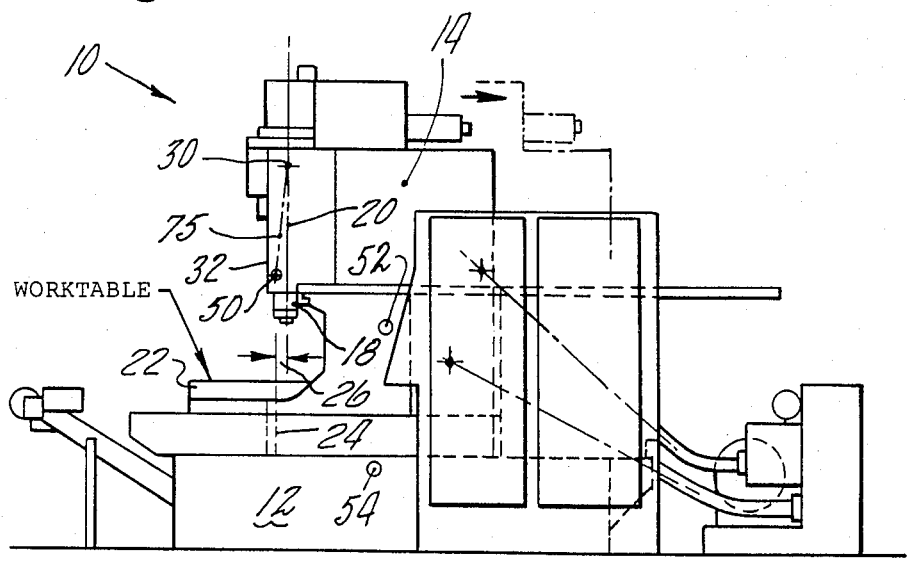
FIG. 1 is a diagrammatic side elevational view of a hydromechanical gear shaper showing the locations of the various sensors utilized in this invention.

Referring now to FIG. 1 there is shown a side elevational diagrammatic view of a hydromechanical gear shaping machine 10, constructed in accordance with the principles described in the aforementioned U.S. patents. The machine includes a fixed base 12 and a movable sub-base 14 which is slidable along base 12 between the full line position shown in FIG. 1 and phantom line position. Sub-base 14 is moved along main axis 16 of the machine by an infeed motor (not shown) responsive to control signals produced by a position control system.

Sub-base 14 carries a spindle 18 the bottom end of which is adapted for receiving a cutting tool or cutter (not shown). Spindle 18 is rotatable about and vertically reciprocable along its axis 20. Worktable 22 is mounted on base 12 for rotation about its axis 24. The worktable is for supporting a workpiece (not shown) to be formed into a gear. Each of the axes 20 and 24 are substantially perpendicular to the longitudinal machine axis 16. Programmed movement of sub-base 14 along axis 16 simultaneously with rotation and vertical reciprocation of the spindle and cutter and rotation of the workpiece results in predetermined variations in the radial infeed or center distance 26 thereby causing the cutter to shape the workpiece in a predetermined manner to form the desired gear.

Cutter spindle 18 and its associated components are contained in cutter spindle housing 32 which is hinged about transverse axis 30 which vertically reciprocates with the spindle. It will be understood by those skilled in the art that housing 32 is mounted so that there will be, in operation, relative movement between the housing and the sub-base.

Figure 3:
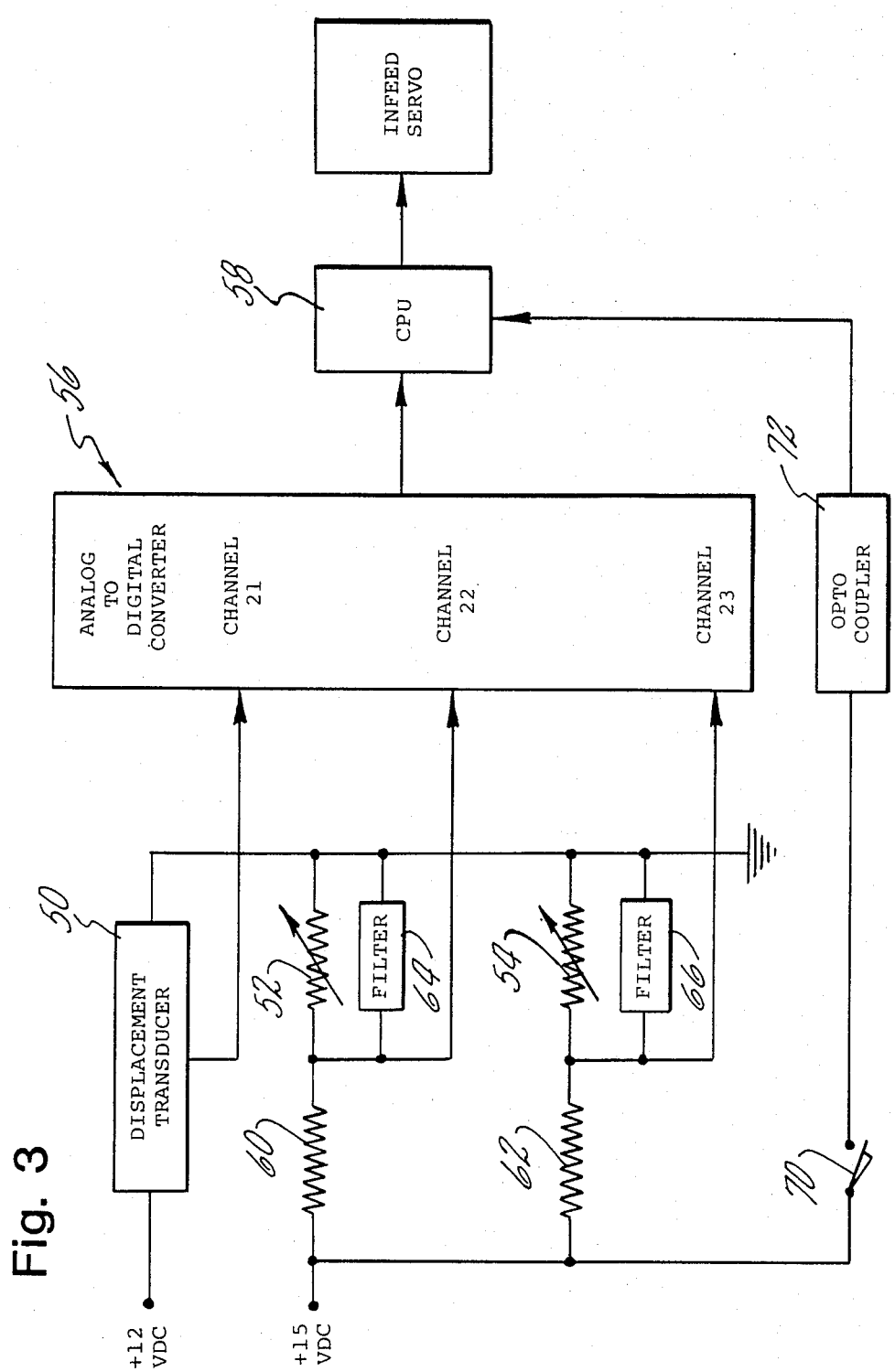
FIG. 3 is a schematic block diagram showing the control system of the invention.

While the aforementioned description describes the conventional operation of a prior art hydromechanical gear shaper, the invention is an improvement of this machine and is adaptable to similar machines. The invention is diagrammatically shown in FIG. 3 and comprises 3 analog sensors (a displacement or proximity transducer 50, a sub-base thermistor 52 and a base thermistor 54) each of the sensors providing an input to analog to digital converter 56, the output of which is connected to CPU 58. Calibrating resistors 60 and 62 as well as filters 64 and 66 are used in a conventional manner to condition the output of thermistors 52 and 54 into converter 56. Sample switch 70 is operatively connected to CPU 58 through optical coupler 72. The location and operation of sample switch 70 will be described in more detail below.

The location of displacement transducer 50 and thermistors 52 and 54 is diagrammatically shown in FIG. 1. These locations are not more specifically located because each location must be somewhat empirically determined on each type of machine design in order to find a mounting location where the sensed parameter will be representative of the thermal expansion and contraction of the associated component. In the preferred embodiment, the mounting locations of thermistors 52 and 54 are generally along the longitudinal machine axis 16 while the location of displacement transducer 50 is preferably somewhat off-center because of the particular type of transducer used. The locations of the various sensors are not absolute and the invention will perform as intended because it is the relative temperature values which are operative to effect infeed motor compensation.

In each type of machine design some components may have a greater thermal effect on machine operation than others. In the hydromechanical gear shaper shown in the figures, it has been determined that the machine base 12 is a primary structural component whose thermal expansion and contraction should be monitored because this component provides a mounting point for the center distance position control system and carries worktable 22 as well as the workpiece. Also, sub-base 14 has been empirically determined to be another primary structural component because it houses most of the drive elements of the machine and is slidably mounted on base 12 for translational motion along axis 16. It has also been determined that cutter spindle housing 32 is a third primary structural component whose temperature should be monitored because it carries cutter spindle 18 and the cutter. The motion of the cutter spindle is such that during its cutting stroke it is engaging the workpiece for chip removal and during its return stroke it is retracted from the workpiece to provide for clearance between the workpiece and the cutter. During the cutting stroke the pass of the cutter may be parallel to workpiece axis 24 or at an incline or may be a curved path depending upon the type of gear being produced. The major amount of temperature induced size changes in gear shaper operations occur between the mounting points of cutter spindle housing 32 and sub-base 14. Thus, the displacement transducer 50 senses the most critical parameter because the area of the cutter spindle housing is one of the hottest areas of the machine (because of the frictional forces associated with the cutting) and because the distance between the cutting point and hinge axis 30 is relatively large, thus magnifying the effect of thermal expansion and contraction. The axis 20 of the cutter spindle is relatively thermally insensitive with respect to housing 32. Thermal expansions and contractions in this area are of a complex non-linear nature and cannot be adequately determined by mere temperature measurements. Consequently, a displacement or proximity transducer rather than a thermistor is utilized to directly sense the displacement of housing 32 relative to its normal (thermal equilibrium) position. The direction of deviation of cutter spindle 18 caused by thermal effects on housing 32 is shown by line 75 which diagrammatically represents (not to scale) motion of axis 20 and housing 32 relative to hinge axis 30 as a result of increased temperature. That is, increased temperature generally means descreased center distance.

Displacement transducer 50 is used to cyclically measure displacement of a predetermined point of spindle housing 32 relative to its mounting points on sub-base 14. The sensed displacement is geometrically related to the displacement of the axis of the cutter spindle from its normal, equilibrium axis. Since the cutter spindle is, during operation, continuously reciprocating and rotating causing the position of the cutter spindle to vary during its cycle, sample switch 70 (shown in FIG. 3) is mounted at a predetermined point (not shown) relative to spindle housing 32 in order to clock the measurements of displacement transducer 50 and other sensors so that they occur during operation always at the same cyclical point during the cutting stroke. Any convenient location may be chosen so long as the measurement is consistent.

As has been stated above, the placement of the various sensors must be representative of the thermal effect on the associated component. Similarly, the amount of correction required for each degree of temperature variation must be determined for each component. Any number of such sensors and associated components may be employed in the operation of the invention if desired.

In order to determine the placement of thermistors 52 and 54 in a particular machine one must empirically determine the relationship between the temperatures sensed at various locations on a component and the expansion or contraction of the component. The locations shown in FIG. 1 for thermistors 52 and 54 are the approximate locations where the sensed temperature of the respective components is most closely linearly related to the amount of expansion or contraction.

The various sensor outputs are read by CPU 58 and processed according to the various programs diagrammatically shown in FIGS. 4-8, in order to arrive at a correction signal which is essentially an arithmetic sum of the component of each thermal expansion or contraction lying along the center distance. For example, the thermal expansion or contraction of base 12 may be empirically related to the temperature sensed by thermistor 54. This thermal effect has a predetermined center distance component along axis 16 affecting distance 26. This thermal effect may be calculated for each degree of temperature change. Similarly, the thermal expansion or contraction of sub-base 14 along line 16 may be determined and combined with the center distance components associated with base 12 to produce the needed correction. As will be understood below, the amount of correction required is related to a particular number of drive pulses to be delivered to the digital infeed motor.

Figure 4:
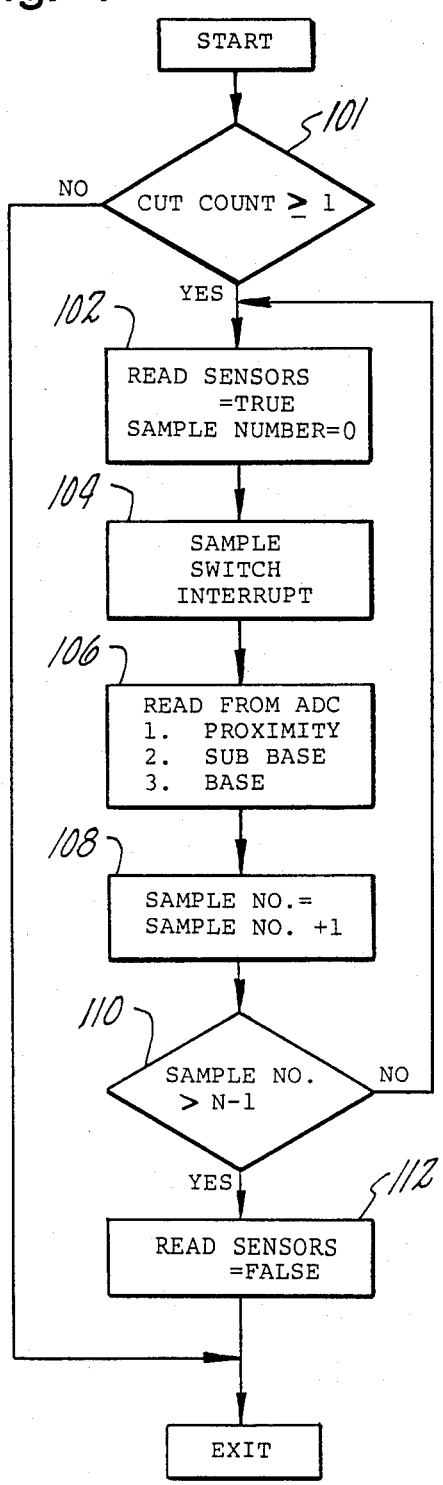
FIG. 4-9 are flow chart diagrams of the programs used in the control system of the invention.
Figure 5:
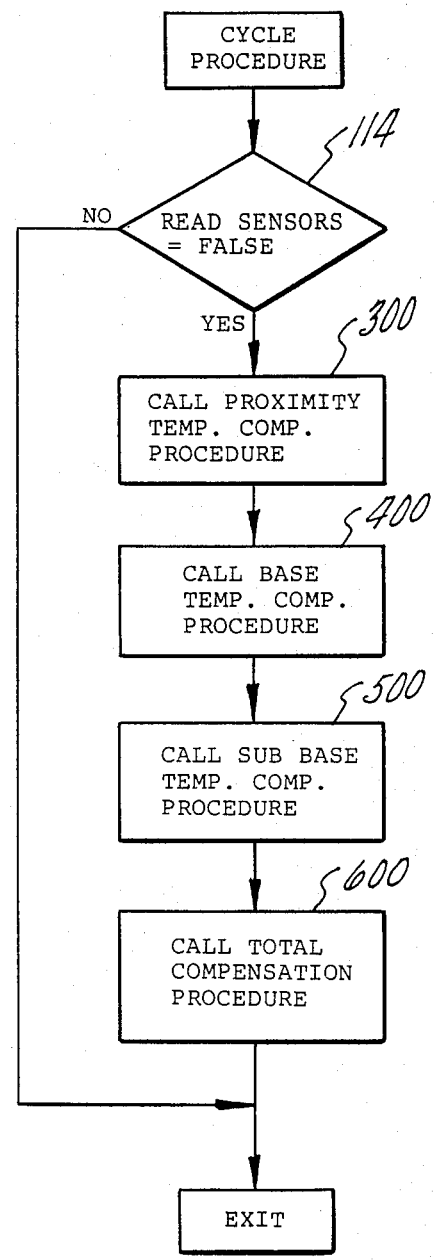

The control programs controlling the operation of CPU 58 are shown in FIGS. 4 and 5. The description of the operation of the control system and the various subroutines shown in FIGS. 6-9 will be described by reference to the various blocks diagrammatically shown in the flow charts.

As shown in FIG. 4, after starting, the program branches to decision block 101 to determine if the cutter is making a cut. The preferred embodiment makes the temperature compensation on the first cut although this could be done periodically during a cut for the production of large gears. In the cut count is one or larger, the program proceeds to block 102 in order to set the "read sensors" flag time and the sample number to zero. The program goes to block 104 to detect the sample switch interrupt produced by closure of switch 70. At the interrupt the program will branch to block 106 causing CPU 58 to read the digital values output from converter 56 corresponding to the displacement or proximity tranducer, the sub-base thermistor and the base thermistor. The values read at this point correspond to displacement in inches and temperature values in degrees.

These values are stored in memory and the program branches to blocks 108 and 110 in order to increment the sample member and determine if N samples have been taken. The number of samples to be taken may be programmed into the control system in order to achieve a satisfactory system operation. All samples are taken at the clock rate when switch 70 is closed.

If the required number of samples have not been taken, the program returns to block 102 in order to repeat the procedure and take the next sample. When N samples have been taken the program will branch to block 112 where the "read sensors" flag will be set false and the program will continue with the cycle procedure shown in FIG. 5. Once N samples have been taken, the program will continue through descision block 114 to access the proximity temperature compensation subroutine 300, the base compensation subroutine 400, the sub-base temperature compensation subroutine 500 and the total compensation procedure 600.

Proximity compensation procedure 300 is used to compare the output of displacement transducer 50 to various predetermined limits and determine the affect of the sensed displacement on the control signals to be provided to the infeed motor. The first time this subroutine is run, a determination is made in decision block 302 if $P_1 > P_R > P_2$ where $P_1$ and $P_2$ are the minimum and maximum predetermined allowable limits of the displacement transducer and $P_R$ is a proximity reference valve. The invention provides for automatic adjustment of the infeed motor to compensate for temperature variations. However, if the sensors determine a parameter to be out of limits this may indicate sudden changes due to something other than expected temperature variations. This will cause the machine to stop. Upon initialization of the control system, $P_R$ is normally set to the midpoint between $P_1$ and $P_2$. The first time the subroutine is run $P_R$ will therefor be within these limits and the program will branch to block 304. Block 304 is not really necessary the first time the subroutine is run since the value of $P_R$ is already set equal to initial value X. When $P_R$ is at the midpoint value the proximity error correction $P_{ERR}$ is defined as 0 pulses since no correction is necessary at this point. The value $P_{ERR}$ is defined in terms of pulses required to be given to the infeed motor to move sub-base 14 a predetermined amount. Block 304 becomes necessary on subsequent runs through subroutine 300 since as will be shown below $P_R$ may change during the operation of the system. The program branches to block 306 where proximity average $P_A$ is determined as being N samples of the proximity transducer output /N. If decision block 308 determines that the proximity average is out of limits an appropriate display is presented at block 309 to the CRT to notify the operator of this condition and the machine is stopped. If $P_A$ is within limits a further check is made at decision block 310 to determine is $P_A$ is $\geq P_R$. If the condition is met the program branches to block 312 where a proximity compensation factor $P_{COMP}$ is determined as $(P_A - P_R) \times S.F.$ where S.F. is a predetermined scaling factor used to convert the digital value of proximity to the number of pulses required to compensate for that value. Simultaneously a new $P_R$ is determined by setting $P_R = P_A$ and a new proximity correction $P_{ERR}$ is set equal to the old $P_{ERR} + P_{COMP}$. In the event that $P_A$ is $< P_R$ the program branches to block 314 where appropriate values of $P_{COMP}$, $P_R$ and $P_{ERR}$ are again determined.

Figure 2:
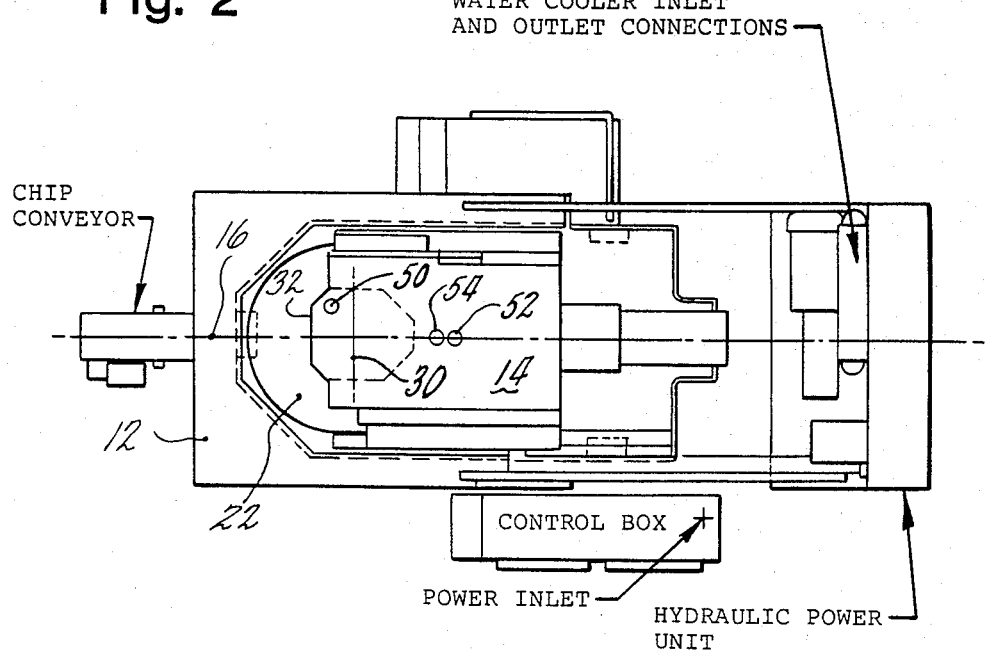
FIG. 2 is a plan view of FIG. 1.
Figure 9:
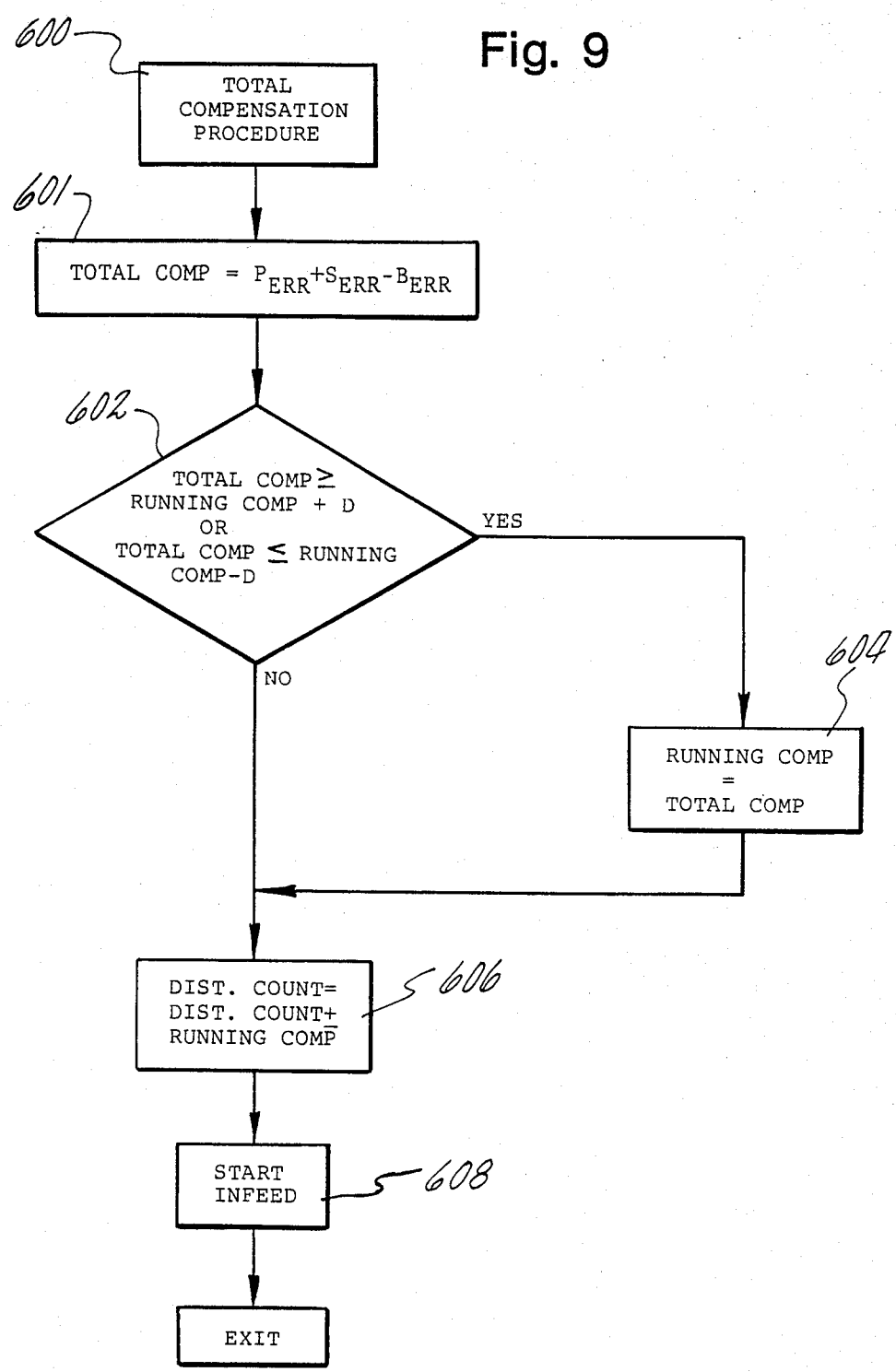

In both situations the program causes the CRT to display $P_{ERR}$ in units of length although it uses this value in units of pulses in the total compensation procedure shown in FIG. 9 to calculate the infeed compensation necessary. Program operation then exits to the cycle procedure shown in FIG. 2 and the cycle is repeated.

Figure 6:
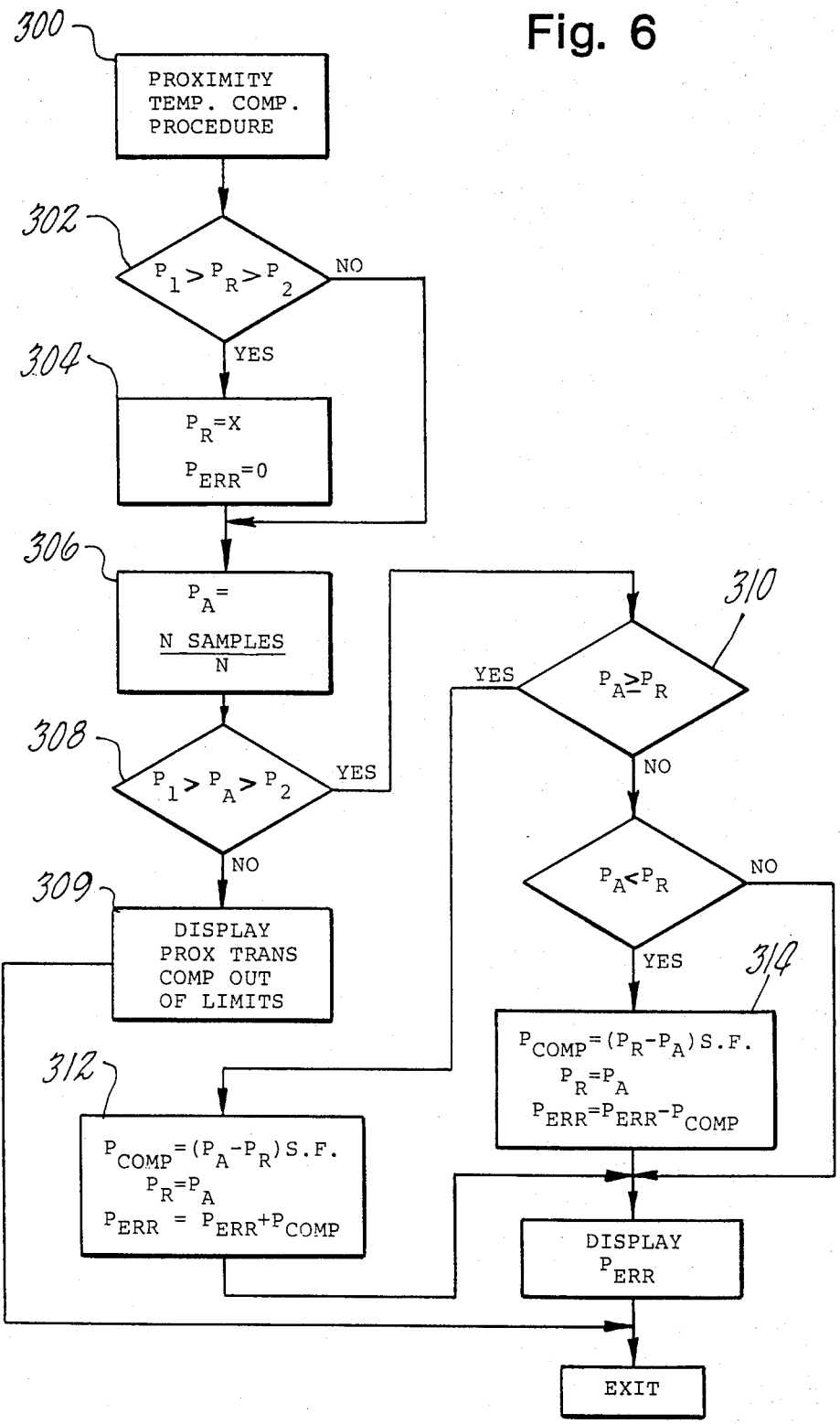
Figure 7:
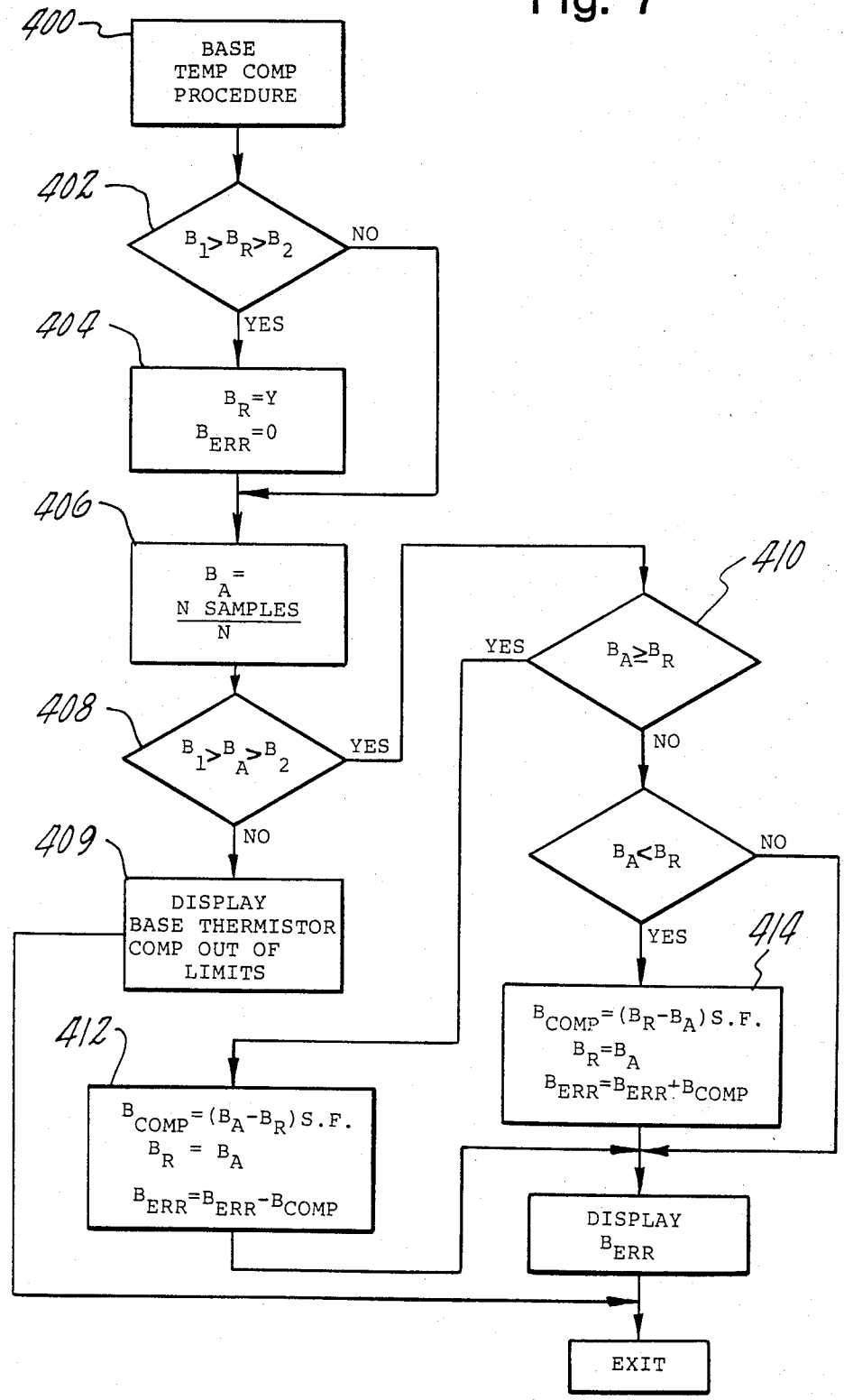
Figure 8:
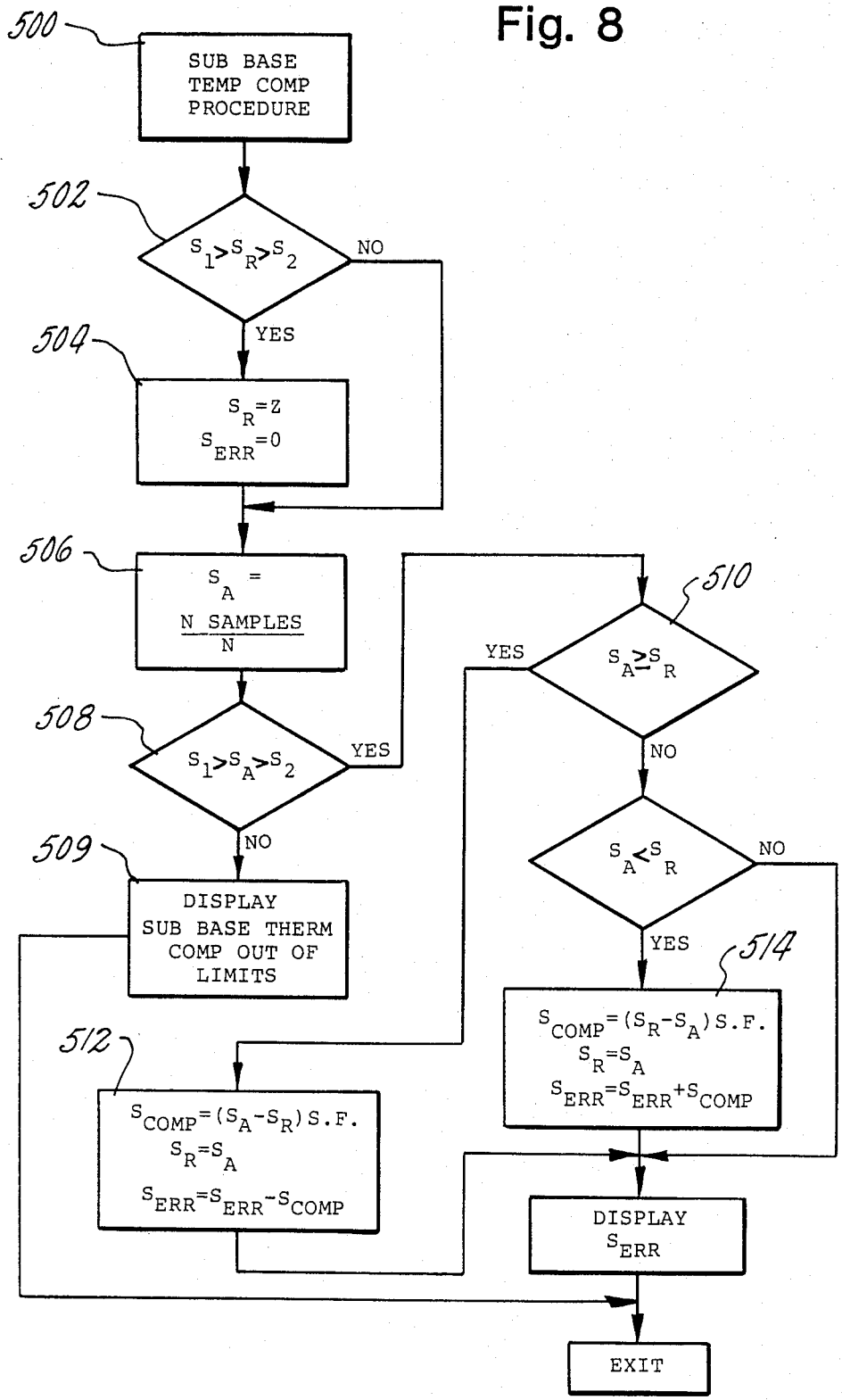

The operation of FIGS. 7 and 8 is similar to that of FIG. 6 and the various program steps are identified by similar numbers although in the 400 and 500 series respectively. The base midpoint is identified as Y and the sub-base midpoint is Z. Each subroutine determines its respective correction factor, all of which are summed in block 601 of FIG. 9 to arrive at total compensation necessary. Note that the base error correction is subtracted from the others because it is the mounting reference on which the other sensors are located. The total compensation is compared in block 602 to a predetermined distance value D and a "running compensation" valve. The "running compensation" is a total correction which may have been determined on previous cycles of system operation (on the first run through this subroutine it is zero) and D equals a predetermined boundary constant such that the running compensation is updated in block 604 only if the total compensation required at any one time is excessive by an amount D. Smaller corrections are therefore not made. The running compensation valve is used in block 606 to update a distance counter in CPU 58 which counts the total number of pulses to be provided to the infeed motor in block 608. The distance counter also receives inputs from the primary position control system.

It will be understood by those skilled in the art that numerous improvements and modifications may be made to the preferred embodiment of the invention disclosed herein without departing from the spirit and scope hereof.

What is claimed is:

1. An apparatus for compensating for thermal expansion or contraction of a machine component along an axis, said component movable along said axis relative to another component by a motor, comprising:
    means for establishing a reference temperature;
    means for determining an average temperature of said machine component;
    comparator means for determining if said average temperature is within predetermined limits;
    means responsive to said comparator means for stopping the operation of said machine if said average temperature is not within said limits;
    means responsive to said comparator means if said average temperature is within said limits for comparing said average temperature to said reference temperature and for producing a correction signal corresponding to the dimensional effect on the difference between said average temperature and said reference temperature; on said machine component; and
    means for applying said correction signal to said motor.

2. In a machine having a first member movable by a motor relative to a second member, an apparatus for compensating for temperature induced size variations of said first or second member occurring along the direction of movement comprising:
    means for establishing a reference temperature;
    means for determining an average temperature of one of said members;
    comparator means for determining if said average temperature is within predetermined limits;
    means responsive to said comparator means for stopping the operation of said machine if said average temperature is not within said limits;
    means responsive to said comparator means if said average temperature is within said limits for comparing said average temperature to said reference temperature and for producing a correction signal corresponding to the dimensional effect of the difference between said average temperature and said reference temperature and said reference temperature on one of said members; and
    means for applying said correction signal to said motor.

3. In a hydromechanical gear shaping machine having a cutter mounted at the end of a spindle, said spindle mounted within a spindle housing for being moved by an infeed motor relative to a workpiece, said motor responsive to signals from a control system, the improvement comprising:
    means for establishing a reference temperature;
    means for determining an average temperature of a predetermined component of said machine;
    comparator means for determining if said average temperature is within predetermined limits;
    means responsive to said comparator means for stopping the operation of said machine if said average temperature is not within said limits;
    means responsive to said comparator means if said average temperature is within said limits for comparing said average temperature to said reference temperature and for producing a correction signal corresponding to the dimensional effect of the difference between said average temperature and said predetermined component; and
    means for applying and correction signal to said motor.

4. In a hydromechanical gear shaper having a base, a sub-base movable relative to said base along a main axis, a spindle having a cutter mounted at one end, said spindle mounted on said sub-base and movable relative thereto, said base for receiving a workpiece, the center of said workpiece mounted on a workpiece axis on and perpendicular to said main axis, the distance between said workpiece axis and said spindle axis defining a center distance, said shaper having a motor controlled by a control means for moving said sub-base relative to said base in order to vary said center distance in a predetermined manner to form a predetermined gear, a temperature compensating apparatus comprising:
    a displacement transducer means operatively mounted for producing a first signal representative of the distance between said cutter and a predetermined thermal equilibrium reference point, said tranducer for sensing thermal expansion and contraction effects on said cutter;

a control means responsive to said first signal for producing a correction signal for said motor, said correction signal corresponding to the extent to which said motor must move said sub-base to compensate for said distance; and a switch operatively connected between said machine and control means for enabling the latter to be responsive to said first signal only during a predetermined portion of the cycle of said cutter.

5. In a hydromechanical gear shaper having a base, a sub-base movable relative to said base along a main axis, a spindle having a cutter mounted at one end, said spindle mounted on said sub-base and movable relative thereto, said base for receiving a workpiece, the center of said workpiece mounted on a workpiece axis on and perpendicular to said main axis, the distance between said workpiece axis and said spindle axis defining a center distance, said shaper having a motor controlled by a control means for moving said sub-base relative to said base in order to vary said center distance in a predetermined manner to form a predetermined gear, a temperature compensating apparatus comprising:

a displacement transducer means operatively mounted for producing a first signal representative of the distance between said cutter and a predetermined thermal equilibrium reference point, said tranducer for sensing thermal expansion and contraction effects on said cutter; a control means responsive to said first signal for producing a correction signal for said motor, said correction signal corresponding to the extent to which said motor must move said sub-base to compensate for said distance;

a first temperature sensor mounted at a first predetermined location on said sub-base for sensing a first temperature at said first location and for providing a first output signal representative of said first temperature;

a second temperature sensor mounted at a second predetermined location on said base for sensing a second temperature at said second location and for providing a second output signal representative of said second temperature;

comparator means for comparing each of said first and second signals to predetermined respective reference values and for producing associated respective correction signals corresponding to said comparison; and control means responsive to said comparator for producing a correction signal necessary to compensate for the effect of said first and second temperatures on said center distance and for providing same to said motor.

* * * * *